US006742786B2

United States Patent
Casel et al.

(10) Patent No.: US 6,742,786 B2
(45) Date of Patent: Jun. 1, 2004

(54) CLAMPING JAW

(75) Inventors: André Casel, Wuppertal (DE); Reiner Ranft, Remscheid (DE)

(73) Assignee: Robert Schröder GmbH & Co. KG, Wuppertal (DE)

( * ) Notice: Subject to any disclaimer, the term of this patent is extended or adjusted under 35 U.S.C. 154(b) by 123 days.

(21) Appl. No.: 10/007,894

(22) Filed: Nov. 13, 2001

(65) Prior Publication Data

US 2002/0113381 A1 Aug. 22, 2002

(30) Foreign Application Priority Data

Feb. 16, 2001 (DE) ...................................... 201 02 880 U

(51) Int. Cl.$^7$ ................................................ B23B 3/12
(52) U.S. Cl. ......................... 279/56; 279/60; 279/123; 408/240
(58) Field of Search ............................. 279/49, 56, 67, 279/68, 123, 137, 152, 153, 46.6, 46, 7, 60; 470/198, 207; 408/240, 120, 121, 122, 123, 122.5

(56) References Cited

U.S. PATENT DOCUMENTS

| 974,896 A | * | 11/1910 | Leland | 279/56 |
| 1,651,087 A | * | 11/1927 | Ellrich | 279/56 |
| 1,857,012 A | * | 5/1932 | Corley | 279/56 |
| 1,875,737 A | * | 9/1932 | Johnson | 279/56 |
| 2,281,416 A | * | 4/1942 | Cote | 408/240 |
| 4,796,900 A | * | 1/1989 | Gant et al. | 279/123 |
| 4,799,832 A | * | 1/1989 | Abbott | 408/123 |
| 5,037,251 A | * | 8/1991 | Roth | 408/222 |

OTHER PUBLICATIONS

Company Brochure"Tools 2002", p. 46 (Tap wrenches and screw extractors—"Innovative Intake"); Robert Schröder GmbH & Co. KG, Wuppertal, Germany.

* cited by examiner

Primary Examiner—Daniel W. Howell
(74) Attorney, Agent, or Firm—Gudrun E. Huckett

(57) ABSTRACT

A clamping jaw for a tool holder chuck, wherein the clamping chuck has two clamping jaws arranged spaced apart and diametrically opposite one another relative to an axis of rotation of the clamping chuck and moveable toward and away from one another for clamping a tool shaft by moving the clamping chuck with a radial component, has a longitudinal slot having a slot mouth open toward the axis of rotation and a slot bottom. The longitudinal slot receives positive-lockingly the tool shaft and has slot flanks defining an approach angle at the slot mouth and a slot bottom angle at the slot bottom. The approach angle is greater than the slot bottom angle. The clamping jaw is manufactured with a disc milling cutter with opposed milling cutter flanks located radially outwardly and positioned slantedly relative to one another at different flank angles. The flank angles increase toward a center of the cutter body.

5 Claims, 1 Drawing Sheet

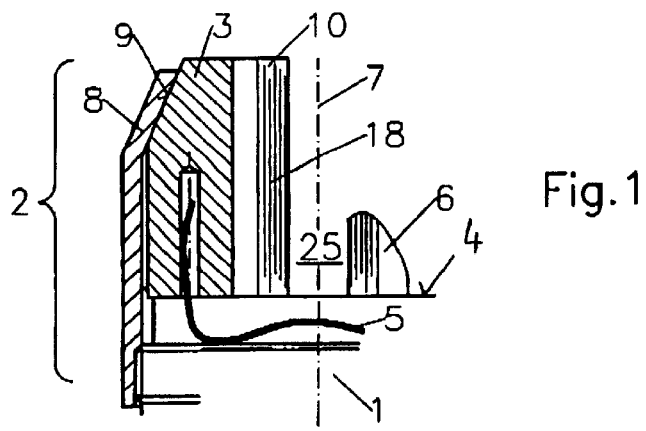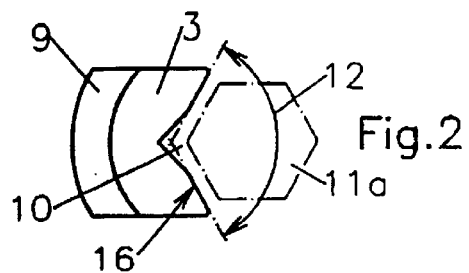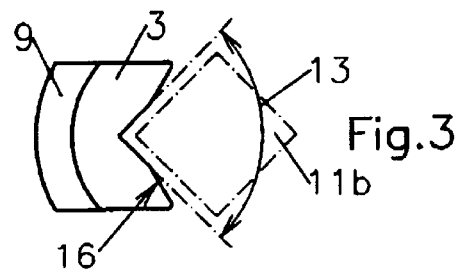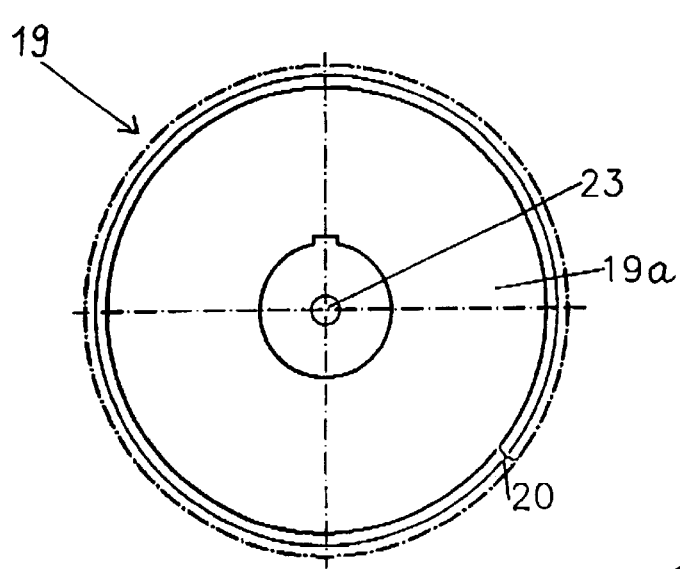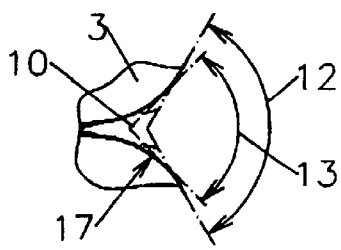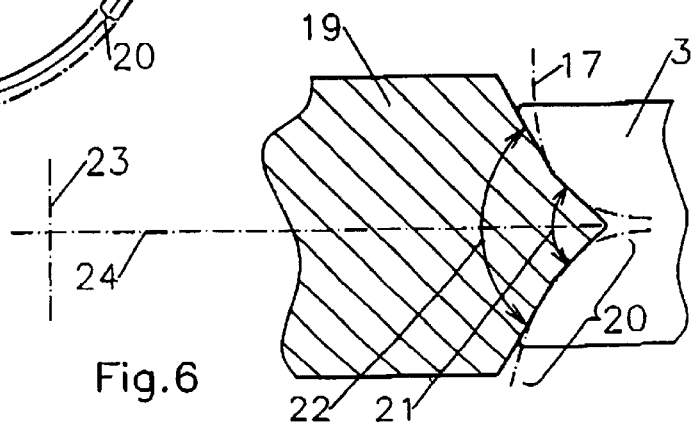

CLAMPING JAW

BACKGROUND OF THE INVENTION

1. Field of the Invention

The invention relates to a clamping jaw for a clamping chuck of a tool holder for paired use with an oppositely positioned clamping jaw, wherein the clamping jaw and the oppositely positioned clamping jaw are positioned diametrically opposite and spaced apart to one another relative to the axis of rotation of the clamping chuck and, by moving the clamping chuck with a radial component, can be moved toward one another and away from one another for clamping or releasing a tool shaft, wherein each clamping jaw comprises a longitudinal slot open toward the axis of rotation of the clamping chuck for positive-lockingly receiving the tool shaft.

2. Description of the Related Art

Clamping jaws with these features are known, for example, from a brochure published by Robert Schröder GmbH & Co. KG, Germany.

Such clamping jaws comprise longitudinal slots which extend substantially axially to the axis of rotation of the clamping chuck and are provided for receiving in a positive-locking way a tool shaft.

Such tool shafts are provided, for example, as square shafts on screw taps or as hexagonal shafts on so-called drill bits.

The term tool holder in the context of the present invention is meant to include also so-called wrenches of screw taps which are generally configured to receive the usually square tool shaft of the screw tap.

In any case, an important feature of such clamping jaws, however, is the preparation for a positive-locking engagement of the tool shaft in order to be able to introduce via the tool holder great torque into the tool, respectively, without there being the risk of slipping of the tool.

Polygonal drive shafts of such tools are then secured positive-lockingly between the clamping jaws of the tool holder which are arranged in pairs, respectively, and cannot slip within the clamping chuck even at highest torques since they do not have radial symmetry.

SUMMARY OF THE INVENTION

It is an object of the present invention to improve the known clamping jaws such that they are suitable for receiving polygonal tool shafts of different cross-sections.

In accordance with the present invention, this is achieved in that the approach angle of the longitudinal slot is greater than the slot bottom angle.

The invention has the advantage that with one and the same tool holder the diametrically oppositely positioned edges or corners of a square tool shaft as well as of a hexagonal tool shaft can be received in a positive-locking way without the clamping jaw pair having to be exchanged prior to clamping, respectively.

For this purpose, the longitudinal slot has two slot flank angles of different size wherein the larger slot flank angle determines the approach cross-section at the mouth of the longitudinal slot while the smaller one defines the slot bottom angle.

The slot flanks of the longitudinal slot, which receive two neighboring polygon sides between them, thus can receive, as a function of the polygon cross-section of the tool shaft, on the one hand a tool shaft having a larger angle and on the other hand a tool shaft having an angle corresponding to the smaller slot bottom angle. In both cases, the longitudinal slot is configured for a positive-locking engagement of a tool shaft wherein two neighboring polygon sides define a predetermined slot flank angle between them.

Without limiting the invention to tool shafts with hexagon and square cross-sections, most application requirements of clamping jaws will be solved with the larger approach angle of the longitudinal slot being 120° and the smaller slot bottom angle being 90°.

According to this embodiment of the invention, the approach angle of 120° is provided for a positive-locking engagement of a hexagon cross-section while the slot bottom angle is provided for a positive-locking engagement of a square cross-section.

It is important in connection with the invention that, because of the paired use of the clamping jaws, the tool shaft is provided with a cross-section of a regular polygon with an even number of polygon sides. This requirement ensures that, with respect to the axis of rotation of the tool holder, two polygon corners are positioned diametrically opposite one another, respectively, which are inserted into the corresponding longitudinal slot of the clamping jaws and are then clamped radially by a movement of the longitudinal slots toward one another.

The longitudinal slots can have an edge at the transition from the approach angle to the slot bottom angle. However, the longitudinal slot can also be rounded at this transitional location so that the contour of the rounded arc or curve extends or tapers tangentially into the slot flanks defining the approach angle as well as into the slot flanks which define the slot bottom angle.

According to another embodiment, the longitudinal slot can also have convexly curved slot flanks with at least two tangents in the area of the approach angle and of the slot bottom angle which fulfill the aforementioned condition.

In this way, it is ensured that, even under consideration of tool wear, the condition as defined above, i.e., the approach angle being greater than the slot bottom angle, is always fulfilled during the manufacture of these clamping jaws.

Advantageously, the present invention is based on the feature that the tool shaft exclusively has surface lines which extend parallel to one another so that all the surface lines of the longitudinal slot extend parallel to the axis of rotation.

In this way, the tool shaft can be reliably clamped in the axial direction without additional clamping components.

In this connection, the expenditure for the invention, in comparison to the achieved advancement, is minimal.

In deviation from the prior art, it is only necessary to employ a disc milling cutter for manufacturing such clamping jaws, wherein the oppositely positioned milling cutter flanks are positioned at a slant to one another first at a small angle and then at a greater angle in the radial direction from the exterior to the interior.

With such a tool, a clamping jaw according to the invention can be produced in a single working step without this requiring any tool change, as used to be the case in the sequential manufacture of a first slot flank angle and then a second slot flank angle.

When, furthermore, a certain wear on such a disc milling cutter for producing such clamping jaws is taken into consideration, further embodiments are conceivable which are produced by means of an already worn disc milling cutter, i.e., the smallest slot flank angle being smaller or identical to 90° and the greatest slot flank angle being greater or identical to 120°; or only two slot flank angles are provided, wherein the smaller one is 90° and the greater one is 120°.

These measures increase thus the possible service life of such manufacturing tools without deviating from the basic principle of the invention.

BRIEF DESCRIPTION OF THE DRAWING

In the drawing:

FIG. 1 shows a clamping jaw according to the invention arranged in the clamping chuck of a corresponding tool holder;

FIG. 2 shows a clamping jaw according to FIG. 1 in a plan view from above illustrating the interaction with a hexagonal tool shaft;

FIG. 3 illustrates a clamping jaw according to the invention in a plan view from above illustrating the interaction with a square tool shaft;

FIG. 4 is a general illustration of modified embodiments of the invention;

FIG. 5 shows a disc milling cutter for producing clamping jaws according to the invention; and FIG. 6 shows a disc milling cutter according to FIG. 5 during manufacture of a clamping jaw according to the invention.

DESCRIPTION OF THE PREFERRED EMBODIMENTS

The following description applies to all Figures if nothing to the contrary is mentioned.

The Figures show a clamping jaw 3 for the clamping chuck 2 of a tool holder 1. It is important that such a clamping jaw 3 cooperates in a paired arrangement with an oppositely positioned clamping jaw 6. Both diametrically oppositely positioned clamping jaws 3, 6 define therebetween an axial, cylindrical hollow space 25 which is generally penetrated centrally by the axis of rotation 7.

Conventionally, the paired clamping jaws 3, 6 are pushed apart by a bracing spring 5 so that they are positioned diametrically opposite and at a spacing to one another relative to the axis of rotation (7). In order to be able to clamp a tool shaft in the straight-cylindrical hollow space 25, it is necessary to advance the clamping jaws 3, 6 with a radial component relative to one another.

For this purpose, each clamping jaw 3, 6 is provided with a slant at its outwardly positioned side so as to have a cone shape and is engaged outwardly by a matching adapter sleeve 8 which belongs to the tool holder 1. The adapter sleeve 8 and the conically shaped slant of the clamping jaw 3, 6 form a matching pair 9 of clamping surfaces (see FIG. 1).

The adapter sleeve 8 is seated with an inner thread on an outer thread of the tool holder 1 and can be moved in the axial direction when rotated. When doing so, the slanted surfaces, forming the clamping surface pair 9 of the clamping jaw 3, 6 and the adapter sleeve 8, glide along one another so that the clamping jaw 3 and the oppositely positioned clamping jaw 6 move toward one another. When opening the adapter sleeve 8, i.e., when rotating it in the opposite direction, the bracing spring 5 acts in such a way that the clamping jaw 3 and the oppositely positioned clamping jaw 6 are moved away from one another.

In this connection, the clamping jaws 3 rest with their underside facing the tool holder 1 flat on the bottom 4 of the tool holder 1 so that they are movable only in the direction toward the axis of rotation 7 or away from it. This movement is imparted onto the clamping jaws 3, 6 in the advancing direction by the adapter sleeve 8 and in the opposite direction by the bracing spring 5, once the adapter sleeve 8 is released.

It is important that each clamping jaw 3, 6 comprises a longitudinal slot 10 open in the direction toward the axis of rotation 7. This longitudinal slot 10 is provided for a positive-locking engagement of the tool shaft.

The invention is characterized in that the approach angle 12 of the slot flanks of the longitudinal slot 10 is greater than the slot bottom angle 13. In this way, tool shafts of different polygonal cross-sections can be introduced between one and the same clamping jaw pair 3, 6 and positive-lockingly clamped therebetween.

This is illustrated in FIGS. 2 and 3.

FIG. 2 shows the introduction of a hexagonal tool shaft 11a into a clamping jaw 3 according to the invention.

The angle which is defined between neighboring tool shaft flanks of the tool shaft is 120° for this regular hexagon. Accordingly, the tool shaft 11a will come to rest on those slot flank portions of the longitudinal slot 10 which define the corresponding approach angle 12. In the present case, the approach angle 12 is 120°.

In contrast to this, FIG. 3 shows the conditions for a tool shaft 11b of a square cross-section. The angle defined between two neighboring tool shaft flanks of a square tool shaft is 90°. Accordingly, the slot bottom angle 13 in the present case is also 90°.

The vertex of the slot bottom angle 13, which is smaller in comparison to the approach angle 12, is father removed from the axis of rotation 7 in any case in order to realize the double function of the clamping jaw according to the invention.

The FIGS. 2 and 3 also show additionally a longitudinal slot 10 which at the transition from the slot flank portions defining the approach angle 12 to the slot flank portions defining the slot bottom angle 13 have a stepped or angled slot portion 16, i.e., the slot flanks are stepped.

This measure provides clearly visible zones in the corresponding longitudinal slot where precisely only the correlated and matching polygonal cross-section of the tool shaft can be received, and this ensures accordingly also a high torque transmission as a result of the large transmitting surfaces between the longitudinal slot and the tool shaft. However, this measure is not a mandatory condition for the realization of the invention.

FIG. 4 shows, in addition to the above disclosure, a longitudinal slot 10 wherein each of the slot flank portions defining the approach angle 12 has a transition into the slot flank portion at the slot bottom in the form of an arc or curve 17 that extends or tapers tangentially. This is to be understood such that the arc or curve 17 extends or tapers tangentially into the slot flank portion of the approach angle 12 as well as into the slot flank portion of the slot bottom angle 13 and, when viewed from the material side of the clamping jaw, extends convexly.

This configuration is conceivable for already slightly worn manufacturing tools for manufacturing such clamping jaws and thus ensures the functionality of such clamping jaws even in the situation where they are manufactured with an already worn manufacturing tool.

Over all, as illustrated in FIG. 6, the longitudinal slot 10 can also have convexly curved flanks as a whole which, in the direction toward the bottom of the slot, correspond to the smaller flank angle 21 and, in the direction toward the slot mouth, correspond to the larger flank angle 22.

As illustrated particularly in FIG. 1, the surface lines 18 of the longitudinal slot 10 extend exclusively parallel to the axis of rotation 7 and thus define a straight-cylindrical space 25 into which the respective tool shaft can be axially introduced.

Moreover, FIGS. 5 and 6 show a tool for manufacturing such clamping jaws and a tool of this kind during the manufacture of such clamping jaws.

According to FIG. 5, a disc milling cutter having a disc-shaped cutter body 19a is provided which has two oppositely positioned milling cutter flanks 20 which are slanted at predetermined flank angles relative to one another.

It is important in this connection that the milling cutter flanks 20 from the exterior to the interior are first slanted at a smaller flank angle 21 and then at a greater flank angle 22 relative to one another, i.e., the flank angles increase radially inwardly, either stepped or continuously.

In this way, the clamping jaw 3, 6 according to the invention can be manufactured with a single tool clamping action because the positive contour of the disc milling cutter corresponds precisely to the negative contour of the clamping jaw 3, as illustrated in FIG. 6.

In this connection it should be noted that such disc milling cutters 19 rotate about an axis of rotation 23 which is illustrated here so as to extend vertically to the paper plane while the clamping jaw 3 is moved tangentially relative to the disc milling cutter 19.

Initially, the milling cutter flanks 20 will penetrate with the smaller flank angle 21 and subsequently with the greater flank angle 22 into the material of the clamping jaw blank and thus machine the longitudinal slot 10 according to the invention into the blank.

Furthermore, FIG. 6 also shows that the longitudinal slot 10 is symmetrical relative to the central radial plane 24 of the disc milling cutter 19 and that, either as a result of tool wear or a corresponding basic contour of the disc milling cutter 19, also such longitudinal slots are encompassed by the invention which follow the contour of the dashed lines.

While specific embodiments of the invention have been shown and described in detail to illustrate the inventive principles, it will be understood that the invention may be embodied otherwise without departing from such principles.

What is claimed is:

1. A clamping jaw (3, 6) for a clamping chuck (2) of a tool holder (1), wherein the clamping chuck (20) comprises two of the clamping jaws (3, 6) arranged spaced apart and diametrically opposite one another in a paired arrangement relative to an axis of rotation (7) of the clamping chuck (2) and configured to be moved toward and away from one another for clamping a tool shaft (11a, 11b) by advancing or retracting the clamping chuck (2) with a radial movement, wherein the clamping jaw (3, 6) has a longitudinal slot (10) having a slot mouth and a slot bottom, wherein the slot mouth opens toward the axis of rotation (7) of the clamping chuck (2), wherein the longitudinal slot (10) has transmitting surfaces for receiving positive-lockingly tool shafts (11a, 11b) of different polygonal cross-sections, and wherein the longitudinal slot (10) has slot flanks provided with the transmitting surfaces, wherein the transmitting surfaces comprise first slot flank portions provided at the slot mouth defining an approach angle (12) of 120° and second slot flank portions at the slot bottom defining a slot bottom angle (13) of 90°.

2. The clamping jaw (3, 6) according to claim 1, wherein the slot flanks of the longitudinal slot (10) are convexly curved.

3. The clamping jaw (3, 6) according to claim 1, wherein the surface lines (18) of the longitudinal slot (10) extend parallel to the axis of rotation (7).

4. The clamping jaw (3, 6) according to claim 1, wherein the slot flanks of the longitudinal slot (10) have an edge (16) at a location where the approach angle (12) passes over into the slot bottom angle (13), wherein the edge (16) is parallel to the axis of rotation (7).

5. The clamping jaw (3, 6) according to claim 1, wherein the slot flanks of the longitudinal slot (10) have a tangentially tapering curve (17) at a location where the approach angle (12) passes over into the slot bottom angle (13).

\* \* \* \* \*